United States Patent
Qin et al.

[11] Patent Number: 6,107,239
[45] Date of Patent: Aug. 22, 2000

[54] HEAT RESISTANT METALLIC OXIDE CATALYST FOR REDUCING POLLUTION EMISSION

[75] Inventors: Jianwu Qin; Pengming Jiang, both of Beijing, China

[73] Assignee: LuChuang Environment Protection Science Co. Ltd., Beijing, China

[21] Appl. No.: 09/054,357

[22] Filed: Apr. 2, 1998

Related U.S. Application Data

[60] Provisional application No. 60/071,777, Jan. 19, 1998.

[51] Int. Cl.[7] .............................. B01J 23/00; B01J 23/42; B32B 15/00; B32B 15/01
[52] U.S. Cl. ......................... 502/300; 502/303; 502/304; 502/324; 502/333; 502/339; 502/349; 502/351; 502/355; 502/327; 502/524; 502/525; 502/527.11; 502/527.15; 502/527.24; 502/500; 502/415; 428/640; 428/652; 428/668; 428/669; 428/671
[58] Field of Search .................................. 502/300, 303, 502/304, 324, 333, 339, 349, 351, 355, 327, 524, 525, 527.11, 527.15, 527.24, 500; 428/640, 652, 668, 669, 671

[56] References Cited

U.S. PATENT DOCUMENTS

| | | | |
|---|---|---|---|
| 4,261,862 | 4/1981 | Kinoshita et al. | 502/324 |
| 4,492,769 | 1/1985 | Blanchard et al. | 502/304 |
| 4,749,671 | 6/1988 | Saito et al. | 502/178 |
| 4,868,148 | 9/1989 | Henk et al. | 502/304 |
| 5,164,350 | 11/1992 | Abe et al. | 502/66 |
| 5,182,249 | 1/1993 | Wang et al. | 502/304 |
| 5,232,890 | 8/1993 | Ganguli et al. | 502/335 |
| 5,559,073 | 9/1996 | Hu et al. | 502/525 |
| 5,597,771 | 1/1997 | Hu et al. | 502/335 |
| 5,792,521 | 8/1998 | Wortman | 427/567 |

Primary Examiner—Mark L. Bell
Assistant Examiner—Patricia L. Hailey
Attorney, Agent, or Firm—Bo-In Lin

[57] ABSTRACT

The present invention discloses an exhaust gas catalyst for reducing the pollutant release containing in the exhaust gas. The catalyst includes a primary-core support carrier composed of gamma-phase aluminum oxide. The core-carrier is coated with $Y_2O_3$ and $ZrO_2$ such that the heat resistance is greatly improved. A two-layer active catalytic structure is formed over the core-carrier. An inner catalytic layer is formed with composition active catalytic elements with approximate weight ratios of La:Ce:Mn:Co:Pd:= 10–15:10–15:6–10:6–10:0.1–0.3. An outer catalytic layer is then coated over the inner catalytic layer. The outer catalytic layer comprises catalytic active elements. The weight ratio of the active catalytic elements are Y:La:Zr:Cu:Cr:V:Pd:= 1–3:2–6:2–6:6–10:10–15:2–6:0.1–0.3.

20 Claims, 1 Drawing Sheet

HEAT RESISTANT METALLIC OXIDE CATALYST FOR REDUCING POLLUTION EMISSION

This Patent Application claims the Priority Date of a Provisional Application Ser. No. 60/ 071,777 filed on Jan. 19, 1998 by the same Inventors for the same subject matters.

BACKGROUND OF THE INVENTION

1. Field of the Invention

This invention relates generally to a pollution control catalyst for treating the exhaust gases. More particularly, this invention relates to an improved catalyst, which has a more low temperature reactive and high temperature resistant core carrier. A two-layer active catalytic structure further provides highly effective purification of exhausted gas composed of lower weight percentages of noble metal. The improved catalytic converter is stable, has high conversion efficiency, high resistance to catalyst poisons, and high temperature substantiality.

2. Description of the Prior Art

Continuous improvement of current technology in catalytic converters for purifying exhaust gas is limited by the technical difficulty that a high catalytic reactivity, which produces high conversion efficiency, often leads to lower operational stability due to low resistance to catalyst poisons and low sustainability when operated under high temperature. The demand for providing a solution is becoming more urgent due to the increasing number of automobiles thus causing the release of larger amounts of exhaust gases containing nitrous oxides (NOx), hydrocarbon (HC) and carbon monoxide (CO) and other types of pollutants into the atmosphere. The air polluted by the released exhaust gases poses serious threat to environment and human health. Therefore, the development of a highly effective catalytic converter, which is capable of stable long-term operation and can be manufactured at reasonable low cost, has been a target for many research and development (R&D) projects.

Various types of catalyst are disclosed for treating the exhaust gases released from the internal combustion engines in order to remove the pollutants such as the hydrocarbon, carbon mono-oxide, and nitrous oxides. Saito et al. disclose in an U.S. Pat. No. 4,749,671, entitled 'Exhaust Gas Cleaning Catalyst and Process for Production Thereof' (Issued on Jun. 7, 1988), an exhaust gas cleaning catalyst composed of a refractory three dimensional structure which supports an active catalytic substance. The surface or part of the catalyst, which is in contact with the exhaust gas, is formed with numerous irregularly arranged protrusions composed of a refractory inorganic powder with different particle sizes. The catalyst according to Saito et al. is able to increase the efficiency by increasing the contact surface between the fine particles and the exhaust gas. It is also more effective in capturing the fine carbonaceous particles from the internal combustion engines. The invention disclosed by Saito et al. where the fine particles of the active catalyst are deposited on the surface for increasing the contact of the catalyst with the exhaust gas does not provide a solution to the problems. The high reactivity catalytic material is generally more vulnerable to the instability caused by either low resistance to catalyst poisons, low temperature sustainability, or low resistance to mechanical vibrations.

Another U.S. Pat. No. 4,492,769, entitled "Pollution Control Catalyst for Internal Combustion Engine Exhaust System/ Catalytic Converter and Process for Its Preparation" was issued on Jan. 8, 1985 to Blanchard et al. It discloses a catalyst for a catalytic converter which is prepared by the steps of: (a) coating and impregnating a support with a catalyst or palladium and at least one base metal element, (b) activating the catalyst at a temperature ranging from 120° to 800° C., (c) coating or impregnating the activated layer with another layer which has at least one platinum group of precious metal other than palladium and at least one other platinum group precious metal, and (d) activating the layer formed in step (c). The technique disclosed by Blanchard et al. is intended to provide improvement in manufacturing process of palladium containing catalyst It may be used to reduce the time and cost for producing the catalyst But the technique does not provide a solution to overcome the basic technical difficulty that the active catalytic layer is vulnerable to the attack of the catalytic poisons and often becomes unreliable after being continuously operated under high temperature and vibration environment Henk et al. disclose in another U.S. Pat. No. 4, 868,148, entitled 'Layered Automotive Catalytic Composite' (Issued Sep. 19,1989), a catalytic composite for treating an exhaust gas from an internal combustion engine. The catalytic composite includes a first support which is a refractory inorganic oxide having dispersed thereon, and at least one noble metal component selected from the group consisting of platinum, palladium, rhodium, ruthenium and iridium are dispersed immediately thereon. An over-layer comprises at least an oxygen storage component and a second support which is a refractory inorganic oxide. The catalytic layer is separated from the oxygen storage component to minimize the formation of $H_2S$ over a catalytic composite. The unpleasant odor generated from $H_2S$ is greatly reduced by the use of this catalyst. The layered structure disclosed in this patent however still does not provide a solution to overcome the technical difficulty caused by the vulnerability of the active catalytic compounds when subject to continuous operation environment as described above.

Another U.S. Pat. No. 5,164,350, entitled "Catalyst Composition for Purification of Exhaust Gas, Catalyst for Purification of Exhaust Gas and Process for Producing Said Catalyst" was issued on Nov. 17, 1992 to Abe et al. It discloses a catalyst composition including a high silica zeolite having a Si/Al ratio of 40 or more. The catalyst composition is subject to ion exchange with at least one metal selected from Pt, Pd, Rh, Ir, and Ru, and a heat resistant oxide containing at least one metal selected from Pt, Pd, Rh, Ir, and Ru. The catalyst composition also includes a monolith carrier to support the catalyst thereon. The catalyst by Abe et al. is to provide a three-way catalyst having sufficient heat resistance and processing high activity for purification. Meanwhile, according to Abe et al., the amount of expensive Rh component support on the carrier is reduced. The catalyst as disclosed by Abe et al. provides a partial solution to the problem encountered by the conventional catalysts by increasing the temperature sustainability while providing high reactivity. However, the active catalytic metals as disclosed by Abe et al., still suffers from the problems that the active catalytic layer is vulnerable to the attack of the catalytic poisons. The sulfur oxides, phosphorous and zinc compounds contained in the exhaust gas may all cause a performance degradation of the active catalytic layer in Abe's catalyst.

In yet another U.S. Pat. No. 5,182,249 entitled 'Non-precious Metal Three-way Catalyst', (Issued on Jan. 26, 1993), Wang et al. disclose a three way catalyst made of mixtures of catalytic components consisting of rare-earth metals and non-precious metal oxides. The catalyst includes a ceramic material as a first carrier comprising a mixture of metallic oxides stabilized by oxides of lanthanide elements disposed on or impregnated into the first carrier. A catalytically active layer structure including a second carrier and an oxide of rare earth metals are coated over the first carrier layer. The catalyst as disclosed by Wang et al. may be employed to reduce the manufacture cost because no precious metal is used. However, the practical usefulness of this catalyst converter is probably quite limited due to the fact that the conversion efficiency is likely not sufficient to be installed on an automobile exhaust pipe or an other kinds of internal combustion engines for actual applications.

Therefore, there is still a demand in the art of exhaust-gas catalyst manufacture to provide a catalytic composition and structure to overcome the technical difficulties encountered in the prior art. Specifically, this catalyst must be able to provide high reactivity rate while maintaining high resistance to catalytic poisons and capable of continuous and reliable operation with high degree of stability at high temperature and harsh vibration environment for long periods of time.

SUMMARY OF THE PRESENT INVENTION

It is therefore an object of the present invention to provide an exhaust gas catalyst to overcome the aforementioned difficulties encountered in the prior art.

Specifically, it is an object of the present invention to provide an exhaust gas catalyst with high reactivity rate after long time high temperature operation by providing a highly heat-resistant core-carrier. The reactive surface-to-weight ratio can be reliably maintained after a prolonged period of high temperature operations such that effective catalytic efficiency can be maintained.

Another object of the present invention is to provide an exhaust gas catalyst with high reactivity rate starting with a relatively low activation temperature such that effective purification of exhausted gases can be achieved.

Another object of the present invention is to provide an exhaust gas catalyst with high reactivity rate and high mechanical strength to endure long-term load of vibration and temperature cycles.

Another object of the present invention is to provide an exhaust gas catalyst with high reactivity rate, which can be manufactured economically by reducing the use of the very expensive elements of Rh, Pt and other precious metals.

Briefly, in a preferred embodiment, the present invention comprises an exhaust gas catalyst for reducing the pollutant release containing in the exhaust gas. The catalyst includes a primary-core support carrier composed of gamma-phase aluminum oxide. The core carrier is coated with $Y_2O_3$ and $ZrO_2$ such that the heat resistance is greatly improved. A two-layer active catalytic structure is formed over the core-carrier. An inner catalytic layer is formed with composition active catalytic elements with approximate weight ratios of La:Ce:Mn:Co:Pd:=10–15:10–15:6–10:6–10:0.1–0.3. An outer catalytic layer is then coated over the inner catalytic layer. The outer catalytic layer comprises catalytic active elements. The weight ratio of the active catalytic elements are Y:La:Zr:Cu:Cr:V:Pd:= 1–3:2–6:2–6:6–10:10–15:2–6:0.1–0.3.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
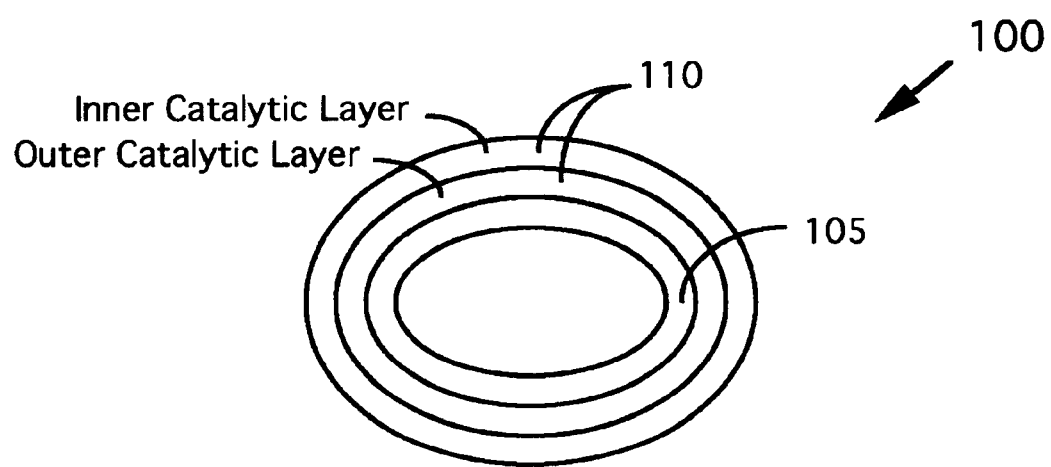
FIG. 1 is a cross-sectional view of a catalyst of the present invention.

According to the present invention, the structure of a three-component catalytic converter for purifying the exhaust gas is first described. More details of the processing steps are then further explained in each specific example provided below.

FIG. 1 shows a catalytic converter 100 of the present invention constructed in a shape suitable for installation onto an automobile exhaust gas pipe. The catalyst converter 100 is formed on a primary support carrier 105. The carrier 105 is generally in the form of a honeycomb monolith core composed of a ceramic material, e.g., $2MgO.Al_2O_3.5SiO_2$. The ceramic carrier has a high pore-volume ratio. For every square inch of surface area there are approximately 350 to 450 pores, i.e., 250–400 pores/inch$^2$. The aluminum oxides can maintain phase stability at high temperature and have a high surface ratio of approximately 100 to 250 $M^2$/g. The surrounding walls in each of these pores are coated with gamma-phased aluminum oxide ($\gamma$-$Al_2O_3$). The gamma-phased aluminum oxide ($\gamma$-$Al_2O_3$) of the core carrier has a weight percentage of about 8–25%. The core carrier is then coated with particular heat-resistant layers comprising $Y_2O_3$ and $ZrO_2$.

A two-layer-active-catalytic temperature-reactive-and-resistant structure 110 is then formed on the primary support 105. The two-layer-active-catalytic temperature-reactive-and-resistant structure 110 includes an inner and outer layers, each including a composite metallic oxide composition. The composite metallic oxide compositions include oxides of metallic elements of La, Ce, V, Zr, Y, Co, Cu, Mn, Cr, and Pd.

The heat-resistant core carrier 105 is fabricated with the processing steps of:

1) Powder of aluminum oxide ($Al_2O_3$) is first mixed with water at a volume ratio of 7 to 10 liters of water with 1 liter of $Al_2O_3$, i.e., 7–10 ($H_2O$): 1 ($Al_2O$). The mixture is then heated and added with solutions of $Y(NO_3)_3$ and $Zr(NO_3)_4$.

2) A honeycomb aluminum-oxide carrier is immersed into the solution prepared in step (1) for about 1 to 5 minutes. The solution treated aluminum-oxide carrier is baked at 200° C. for one to three hours and then heat-treated at 300–500° C. for three to five hours. A coat is formed on the aluminum oxide carrier, which has a weight ratio of about 8 to 15%. The weight ratio of $ZrO_2$ is about 0.5-1% and $Y_2O_3$ is about 1 to 2%. The treated aluminum oxide carrier is then aged under a heat treatment of 900° C. for about twelve hours.

The surface-to-weight ratio of such a carrier is above 150 $m^2$/g.

The catalytic converter includes a two-layer-active-catalytic temperature-reactive-and-resistant structure 110. It includes an inner layer composed of Perovskite composite oxides of catalytic metals including noble metals, for example. The inner layer also comprises Perovskite composite oxides of metals such as La, Ce, Mn, and Co. The processing details to form this layer on the carrier will be further described below. Basically, the process for coating this inner layer involves the immersing the aluminum-oxide carrier in a metallic nitride-acid or hydride-add solution. The weight ratio of the active catalytic elements are La:Ce:Mn:Co:Pd:=10–15:10–15:6–10:6–10:0.1–0.3. The solution treated carrier is then baked at 100–200° C. and heat-treated at 200– 800° C. to form an inner layer of Perovskite composite oxides of active catalytic metals.

The outer layer composed of Spinel composite oxides of active catalytic metals includes noble metals such as palladium. Additionally, the outer layer also comprises Spinel composite oxide of metals such as La, Zr, Y, Cu, Cr, and V. The processing details to form this layer on the carrier over the inner layer will be further described below. Basically, the process for coating this outer layer over the inner layer involves the immersing the aluminum-oxide carrier in a metallic nitride-acid or hydride-add solution. The weight ratio of the active catalytic elements are Y:La:Zr:Cu:Cr:V:Pd:= 1–3:2–6:2–6:6–10:10–15:2–6:0.1–0.3. The solution treated carrier is then baked at 100–200° C. and heat-treated at 200–800° C. to form an outer layer of Spinel composite oxides of active catalytic metals. The aluminum carrier now coated with the inner and outer layers are placed in an enclosed chamber heated to 300–500° C. and treated with hydrogen gas for two hours to convert metallic compounds, e.g., chemical compositions of $PdCl_2$ or $Pd(NO_3)_2.2H_2O$, back to metal crystals. It is then totally cooled to a room temperature and thus completing the fabrication process. A catalyst converter is thus formed wherein the composition of the outer layer preferably contains Pd with a weight ratio of about 0.05 to 0.12%.

The catalytic converter with a two-layer-active-catalytic temperature-reactive-and-resistant structure 110 provides many advantages. Specifically:

1) The core carrier now composed of gamma-aluminum oxide ($\gamma$-$Al_2O_3$) is now made with compositions of $Y(NO_3)_3$ and $Zr(NO_3)$ 4. The heat resistance of the core carrier is greatly improved. The core carrier with the aluminum oxide is prevented from surface-structure degradation due to heat exposure. The surface-to-weight ratio is maintained at 150 $m^2/g$ after twelve hours of aging process at 900° C.

2) The two-layer active-catalytic structure 110 provides excellent pollution purification capability. The outer layer with Spinel composite oxides of active catalytic metals such as noble metals palladium provides catalytic conversions of CO, HC and $NO_x$. selectively. The inner layer composed of Perovskite composite oxides of active catalytic metals such as oxide of palladium is effective to convert $NO_x$ and selectively carry out the catalytic conversion of CO and HC. Therefore, the catalytic converter is very effective to control and purify the contaminants released from the exhausted gases from the inner combustion engines.

3) The catalytic converter of this invention has a high temperature resistance and large oxygen storage capacity. Therefore, the catalytic converter is suitable for application to broader scope of operational conditions. Meanwhile, the catalytic converter can sustain higher temperature and has longer useful operation life cycles.

4) The catalytic converter is more reactive at a lower temperature during a cold start of an inner combustion engine. Better air quality and purification effect of exhausted gases can be achieved, particularly, during the initial startup periods.

According to the above descriptions, this invention discloses a catalyst for reducing the pollutant release containing in the exhaust gas. The catalyst comprises a primary-core support carrier composed of a gamma-phase aluminum oxide coated with $Y_2O_3$ and $ZrO_2$. The catalyst further includes an inner catalytic layer composed of active catalytic elements comprising La, Ce, Mn, Co, and Pd, formed over the support carrier. The catalyst further includes an outer catalytic layer coated over the inner catalytic layer composed of active catalytic elements comprising Y, La, Zr, Cu, Cr, V, and Pd wherein the element Y has a weight percentage of approximately 0.5%. In a preferred embodiment, the outer catalytic layer is composed of the element Zr of approximately 0.3 %. In another preferred embodiment, the outer catalytic layer has a weight percentage ratio of the element Y to the element Zr of approximately 1–3:6–10. In another preferred embodiment, the inner catalytic layer composed of composite oxides of catalytically active metals including Perovskite type of crystals of $ABO_3$ where A is at least one element selected from a group consisting of metals in Groups 1A, 1B, 2A, 3B, 4A and 5A in the Periodic Table including the elements with atomic number from 58 to 71, and actinide metals having an atomic number ranging from 90 to 104 and said element B is at least one metal selected from groups consisting of 1A, 1B, 2A, 2B, 3A, 3B, 4A, 4B, 5A, 5B, 6B, 7B, and elements of transition metals. In another preferred embodiment, the primary-core support carrier is a ceramic material comprising $2MgO.Al_2O_3.5SiO_2$. In another preferred embodiment, the outer catalytic layer further includes Spinel composite oxides of catalytically active compounds of rare earth elements, base metals, or noble metals.

In summary, this invention discloses a catalyst for reducing the pollutant release containing in the exhaust gas. The catalyst includes a primary-core support carrier composed of a ceramic material coated with oxides of Yttrium and Zirconium wherein the weight percentage of yttrium is approximately 0.3%. In a preferred embodiment, the catalyst further includes a two catalytic layer structure. The two catalytic layer structure includes an outer catalytic layer composed of active catalytic composite oxides of Yttrium and Zirconium wherein the element Yttrium has a weight percentage of approximately 0.5%. In a preferred embodiment, the outer catalytic layer further comprises a composite oxide of Zirconium that has a weight percentage ratio of Yttrium to Zirconium of approximately 1–3:6–10.

The following processing steps present an example by which a preferred embodiment of the catalytic converter is manufactured.

Mixing 400 grams of aluminum oxide ($Al_2O_3$) powder with water at a volume ratio of 7 to 10 liters of water with 1 liter of $Al_2O_3$, i.e., 7–10 ($H_2O$): 1 ($Al_2O_3$). The mixture is stirred and uniformly mixed, and then heated. Solutions of 40 ml of $Y(NO_3)_3$ and 60 ml of $Zr(NO_3)_4$ are added. It is stirred to obtain a uniform mixture. A honeycomb aluminum-oxide carrier with 300 pores/$in^2$ is immersed into the solution for three minutes. The solution treated aluminum-oxide carrier is baked at 200° C. for one hour and then heat-treated at 400° C. for three hours. A coated carrier is formed on the aluminum oxide core. The weight ratio of $ZrO_2$ is about 0.5–1% and $Y_2O_3$ is about 1 to 2%.

The ceramic honeycomb covered with a combination of heat-treated aluminum oxides, $ZrO_2$, and $Y_2O_3$ is ready to form an inner active catalytic layer. A solution is prepared with 100 grams of $La(NO_3)_3.8H_2O$, 100 grams of $Ce(NO_3)_3.6H_2O$, 50 grams of $Co(NO_3)_2.6H_2O$, 80 ml of 50% $Mn(NO_3)_2$, and one gram of $Pd(NO_3)_2$. The ceramic honeycomb carrier is immersed in the active catalytic solution for about five minutes. The solution treated carrier is then baked at 200° C. for two hours and then heat-treated at 750° C. for six hours to form the inner active catalytic layer on the carrier.

The ceramic core carrier coated with the inner active is ready to form an outer active catalytic layer thereon. A solution is prepared with 50 grams of $La(NO_3)_3.8H_2O$, 30 grams of $Zr(NO_3)_3.6H_2O$, 100 grams of $Cr(NO_3)_2.9H_2O$, 50 grams of $Cu(NO_3)_3 \cdot 3H_2O$, 30 grams of $V(NO_3)_3$, 30 grams of $Y(NO_3)_3$, and one gram of $Pd(NO_3)_2$. The ceramic honeycomb carrier is immersed in the active catalytic solution for about five minutes. The solution treated carrier is then baked at 200° C. for three hours and then heat-treated at 600° C. for four hours to form the outer active catalytic layer on the carrier.

The catalytic converter is then placed in a reaction chamber heated to 300–500° C. and treated with hydrogen gas for two hours to convert metallic compounds, e.g., chemical compositions of $PdCl_2$ or $Pd(NO_3)_2 \cdot 2H_2O$, back to metal crystals. It is then totally cooled to a room temperature and thus completing the fabrication process.

The catalytic converter is placed under an aging process at 900° C. for twelve hours. Employing a simulation tester where a stream of simulated exhausted gas is passed through to carry out a test. The simulated exhausted-gas is a gas composed of 1000ppm NO, 1500ppm $C_3H_8$, 1.5% of CO, 0.9–1.3% Oxygen, 30ppm $SO_2$, and rest is $N_2$. After a test conducted in an air speed of 60000 ft/hr, excellent test results are obtained. The activation temperature for HC is 220° C., CO is 240° C., and $NO_x$ is 270° C. The conversion ratios at 450° C. are 97% for HC, 94% for CO and 95% for $NO_x$.

According to above descriptions, this invention also discloses a method for manufacturing a catalyst for reducing the pollutant release containing in the exhaust gas. The method includes the steps of: (a) forming a primary-core support carrier by coating a gamma-phase aluminum oxide with $Y_2O_3$ and $ZrO_2$.; (b) coating over the support carrier an inner catalytic layer composed of active catalytic elements comprising La, Ce, Mn, Co, and Pd, formed; and (c) coating over the inner catalytic layer with an outer catalytic layer composed of active catalytic elements comprising Y, La, Zr, Cu, Cr, V, and Pd wherein the element Y has a weight percentage of approximately 0.5%. In a preferred embodiment, the outer catalytic layer is composed of the element Zr in an amount of approximately 0.3%. In another preferred embodiment, the outer catalytic layer has a weight percentage ratio between the element Y to the element Zr of approximately 1 . 3:6–10. In another preferred embodiment, the inner catalytic layer is composed of composite oxides of catalytically active metals including Perovskite type of crystals of $ABO_3$, where A is at least one element selected from a group consisting of metals in Groups 1A, 1B, 2A, 3B, 4A and 5A in the periodic table including the elements with atomic number from 58 to 71, and actinide metals having an atomic number ranging from 90 to 104 and the element B is at least one metal selected from groups consisting of 1A, 1B, 2A, 2B, 3A, 3B, 4A, 4B, 5A, 5B, 6B, 7B, and elements of transition metals. In another preferred embodiment, the primary-core support carrier is a ceramic material comprising $2MgO \cdot Al_2O_3 \cdot 5SiO_2$. In another preferred embodiment, the outer catalytic layer further includes Spinel composite oxides of catalytically active compounds of rare earth elements, base metals, or noble metals. In yet another preferred embodiment, the primary-core support carrier is a ceramic material comprises $2MgO \cdot Al_2O_3 \cdot 5SiO_2$. In yet another preferred embodiment, the outer catalytic layer further includes Spinel composite oxides of catalytically active compounds of rare earth elements, base metals, or noble metals.

More specifically, this invention discloses a method of manufacturing a catalyst for reducing the pollutant release containing in the exhaust gas. The method includes the steps of: (a) forming a primarycore support carrier by coating a layer composed of $Y_2O_3$ and $ZrO_2$ over a a ceramic carrier composed of $2MgO \cdot Al_2O_3 \cdot 5SiO_2$; (b) coating over the primary-core support carrier an inner catalytic layer composed of composite oxides of catalytically active metals including Perovskite type of crystals of $ABO_3$ where A including metals selected from groups 1A, 1B, 2A, 3B, 4A and 5A in the periodic table including the elements with atomic number from 58 to 71, or metals selected from a group consisting of actinons rare earth metals including metals with atomic number ranging from 90 to 104 and the element B being selected from groups 1A, 1B, 2A, 2B, 3A, 3B, 4A, 4B, 5A, 5B, 6B, 7B, and the elements such as transition metals in 3d, 4s, 4d, or 5s in group 8; and (c) coating over the inner catalytic layer an outer catalytic layer coated over the inner catalytic layer composed of active catalytic elements comprising Yttrium and Zirconium and further includes Spinel composite oxides of catalytically active compounds of rare earth elements, base metals, or noble metals wherein the element Yttrium has a weight percentage of approximately 0.5%.

Therefore, the present invention discloses an exhaust gas catalyst that enables those of ordinary skill in the art to overcome the difficulties and limitations encountered in the prior art. Specifically, the present invention provides an exhaust gas catalyst with high reactivity rate after long time high temperature operation. This is achieved by providing a highly heat-resistant core-carrier. The reactive surface-to-weight ratio is reliably maintained after prolonged period of high temperature operations such that effective catalytic efficiency can be maintained. Furthermore, this invention provides an exhaust gas catalyst with high startivity rate starting which has a relatively low activation temperature such that effective purification of exhausted gases can be achieved. With a high mechanical strength, the catalyst can also endure long-term load of vibration and temperature cycles. The exhaust gas can be manufactured economically by reducing the use of the very expensive elements of Rh, Pt and other precious metals. A highly efficient catalyst can therefore be provided with lower production costs.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A catalyst for reducing the pollutant release containing in the exhaust gas comprising:
   a primary-core support carrier comprising a gamma-phase aluminum oxide coated with $Y_2O_3$ and $ZrO_2$;
   an inner catalytic layer comprising La, Ce, Mn, Co, and Pd, formed over said support carrier; and
   an outer catalytic layer comprising Y, La, Zr, Cu, Cr, V, and Pd wherein said element Y has a weight percentage of approximately 0.5%, said outer catalytic layer coated over said inner catalytic layer.

2. The catalyst of claim 1 wherein:
   said outer catalytic layer has an approximately 0.3 % weight percentage of said element Zr.

3. The catalyst of claim 1 wherein: said outer catalytic layer has a weight percentage ratio of said element Y to said element Zr of approximately 1–3:6–10.

4. The catalyst of claim 1 wherein:
   said inner catalytic layer further comprises Perovskite type of crystals of $ABO_3$ where A is at least one element selected from a group consisting of metals in Groups 1A, 1B, 2A, 3B, 4A and 5A in the periodic table including the elements with atomic number from 58 to 71, and actinide metals having an rare atomic number ranging from 90 to 104 and said element B is at least one metal selected from groups consisting of 1A, 1B, 2A, 2B, 3A, 3B, 4A, 4B, 5A, 5B, 6B, 7B, and elements of transition metals.

5. The catalyst of claim 1 wherein:

said primary-core support carrier is a ceramic material comprising $2MgO.Al_2O_3.5SiO_2$.

6. The catalyst of claim 3 wherein:

said outer catalytic layer further comprises Spinel composite oxides of catalytically active compounds of rare earth elements or noble metals.

7. A catalyst for reducing the pollutant release containing in the exhaust gas comprising:

a ceramic primary-core support carrier coated with oxides of Yttrium and Zirconium wherein said Yttrium has a weight percentage of approximately 0.3%.

8. The catalyst of claim 7 further comprising:

a two-catalytic layer structure, covering said ceramic primary-core support carrier, wherein said two-catalytic structure includes an outer catalytic layer of composite oxides of Yttrium and Zirconium wherein said element Yttrium has a weight percentage of approximately 0.5%.

9. The catalyst of claim 8 wherein:

said outer catalytic layer further comprises a composite oxide of Zirconium having a weight percentage ratio of approximately 1–3:6–10 between said element Yttrium to said element Zirconium.

10. A catalyst for reducing the pollutant release containing in the exhaust gas comprising:

a ceramic primarycore support means comprising $2MgO.Al_2O_3.5SiO_2$ coated with $Y_2O_3$ and $ZrO_2$;

an inner catalytic layer of Perovskite type of crystals of $ABO_3$ where A is at least one element selected from a group consisting of metals in Groups 1A, 1B, 2A, 3B, 4A and 5A in the periodic table including the elements with atomic number from 58 to 71, and actinide metals having an atomic number ranging from 90 to 104 and said element B is at least one metal selected from groups consisting of 1A, 1B, 2A, 2B, 3A, 3B, 4A, 4B, 5A, 5B, 6B, 7B, and elements of transition metals, said inner catalytic layer coated over said support carrier and actinide metals having an atomic number ranging from 90 to 104 and said element B is at least one metal selected from groups consisting of 1A, 1B, 2A, 2B, 3A, 3B, 4A, 4B, 5A, 5B, 6B, 7B, and elements of transition metals;

an outer catalytic layer comprising Yttrium and Zirconium and Spinel composite oxides of rare earth elements, or noble metals wherein said element Yttrium has a weight percentage of approximately 0.5%, wherein said outer catalytic layer is coated over said inner catalytic layer.

11. A method for manufacturing a catalyst for reducing the pollutant release containing in the exhaust gas comprising:

(a) forming a primary-core support carrier by coating a gamma-phase aluminum oxide with $Y_2O_3$ and $ZrO_2$;

(b) coating over said support carrier an inner catalytic layer of active catalytic elements comprising La, Ce, Mn, Co, and Pd; and (c) coating over said inner catalytic layer with an outer catalytic layer of active catalytic elements comprising Y, La, Zr, Cu, Cr, V, and Pd wherein said element Y has a weight percentage of approximately 0.5%.

12. The method of claim 11 wherein:

said outer catalytic layer has approximately 0.3% weight percentage of said element Zr.

13. The method of claim 11 wherein:

said step (c) of coating said outer catalytic layer over said inner catalytic layer is a step of coating said outer catalytic layer having a weight percentage ratio between said element Y to said element Zr of approximately 1–3:6–10.

14. The method of claim 11 wherein:

said inner catalytic layer comprises Perovskite type of crystals of $ABO_3$ where A is at least one element selected from a group consisting of metals in Groups 1A, 1B, 2A, 3B, 4A and 5A in the periodic table including the elements with atomic number from 58 to 71, and actinide metals having an atomic number ranging from 90 to 104 and said element B is at least one metal selected from groups consisting of 1A, 1B, 2A, 2B, 3A, 3B, 4A, 4B, 5A, 5B, 6B, 7B, and elements of transition metals.

15. The method of claim 11 wherein:

said primary-core support carrier is a ceramic primary-core support carrier comprising $2MgO.Al_2O_3. 5SiO_2$.

16. The method of claim 13 wherein:

said outer catalytic layer further comprises Spinel composite oxides of catalytically active compounds of rare earth elements, or noble metals.

17. A method for manufacturing a catalyst for reducing the pollutant release containing in the exhaust gas comprising:

(a) forming a primary-core support carrier by coating a ceramic material with oxides of Yttrium and Zirconium wherein said Yttrium having a weight percentage of approximately 0.3%.

18. The method of claim 17 further comprising:

(b) coating over said primary-core support carrier with a two-catalytic layer structure which further comprises an outer catalytic layer comprising composite oxides of Yttrium and Zirconium wherein said element Yttrium has a weight percentage of approximately 0.5%.

19. The method of claim 18 wherein:

said step (b) of forming said outer catalytic layer is a step of forming said outer catalytic layer which further comprises a composite oxide of Zirconium having a weight percentage ratio of approximately 1–3:6–10 between said element Yttrium to said element Zirconium.

20. A method of manufacturing a catalyst for reducing the pollutant release containing in the exhaust gas comprising:

(a) forming a ceramic primary-core support carrier of $2MgO.Al_2O_3.5SiO_2$ by coating a layer of $Y_2O_3$ and $ZrO_2$ over said ceramic carrier;

(b) coating over said primary-core support carrier an inner catalytic layer comprises Perovskite type of crystals of $ABO_3$ where A is at least one element selected from a group consisting of metals in Groups 1A, 1B, 2A, 3B, 4A and 5A in the periodic table including the elements with atomic number from 58 to 71, and actinide metals having an atomic number ranging from 90 to 104 and said element B is at least one metal selected from groups consisting of 1A, 1B, 2A, 2B, 3A, 3B, 4A, 4B, 5A, 5B, 6B, 7B, and elements of transition metals; and (c) coating over said inner catalytic layer an outer catalytic layer of Yttrium and Zirconium wherein said outer catalytic layer further includes Spinel composite oxides of rare earth elements, or noble metals wherein said element Yttrium has a weight percentage of approximately 0.5%.

* * * * *